April 19, 1955 L. ECKLER ET AL 2,706,310
PROCESS FOR FINISHING ORGANIC THERMOPLASTIC SHEETING
Filed Dec. 14, 1950
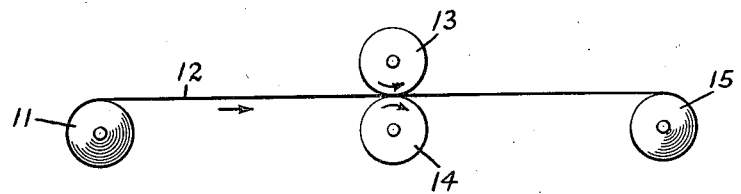
INVENTORS.
LEOPOLD ECKLER
WILLIAM P. MOELLER
BY
ATTORNEYS.

2,706,310

PROCESS FOR FINISHING ORGANIC THERMOPLASTIC SHEETING

Leopold Eckler, Summit, and William P. Moeller, Orange, N. J., assignors to Celanese Corporation of America, New York, N. Y., a corporation of Delaware Application December 14, 1950, Serial No. 200,796

12 Claims. (Cl. 18—48)

This invention relates to organic thermoplastic sheeting and relates more particularly to an improved process for the finishing of organic thermoplastic sheeting.

According to a method commonly employed for the production of organic thermoplastic sheeting, such as sheets, films, foil and the like, an organic thermoplastic material is extruded at an elevated temperature through an orifice of suitable configuration which shapes the thermoplastic material to the desired form. While this process is highly economical in the use of equipment and materials, the organic thermoplastic sheeting produced thereby contains a large number of conspicuous surface blemishes, hereinafter referred to as "gels," which appear as pimples and irregularities in the finished material, and greatly limit the usefulness of said sheeting in many fields. Normally these surface defects are eliminated by pressing the material at elevated temperatures between highly polished metal plates. This is a discontinuous process, resulting in sheets of limited size.

It is an important object of this invention to provide a continuous process for the production of organic thermoplastic sheeting which will be free from the foregoing and other disadvantages and which will be especially efficient in operation.

A further object of this invention is to provide a process for the finishing of organic thermoplastic sheeting which will greatly lessen or remove the effect normally exhibited by the sheeting when gels are present therein.

Another object of this invention is to provide a process for the finishing of organic thermoplastic sheeting containing gels by subjecting said sheeting to a pressing operation between unheated members.

Still another object of this invention is the provision of an improved process for the finishing of organic thermoplastic sheeting containing gels by passing said sheeting between unheated or cooled rotatable surfaces which are pressed towards each other to provide a predetermined pressure on said sheeting.

Other objects of this invention will be apparent from the following detailed description and claims.

According to the present invention, we have discovered that the blemished appearance imparted to organic thermoplastic sheeting by the presence of gels therein may be greatly reduced or substantially eliminated by subjecting said sheeting to a pressing operation between unheated members. In carrying out the process of the present invention, the organic thermoplastic sheeting containing gels, and which may have been made by the extrusion process, is advantageously passed between a pair of unheated or cooled rolls which are positively driven and which are urged towards each other to apply the desired pressure to said sheeting. A unit pressure of at least about 2000 pounds per square inch or preferably about 5000 pounds per square inch must be applied to the sheeting to obtain the desired effect. The pressing operation is carried out without applying heat to or even cooling the rolls, say to a temperature below about 100° F., and without applying heat to the organic thermoplastic sheeting. Advantageously, the temperature of the sheeting is held below about 100° F., and preferably below about 70° F., at all times. The organic thermoplastic sheeting may be precooled to a temperature of below about 40° F., and preferably below about +10° F., before it is passed between the rolls to keep the temperature of said sheeting at all times within the limits specified above. The pressing operation should reduce the gage of the sheeting by at least about 10% and preferably by at least about 20%.

In addition to eliminating the effect of gels, the pressing operation improved the uniformity of the gage of said organic thermoplastic sheeting.

The process of the present invention may be employed for the finishing of sheeting made from any desired organic thermoplastic material, such as, for example, polystyrene, vinyl chloride polymers and copolymers, and acrylic resins. It is, however, especially suited for the finishing of sheeting made from organic acid esters of cellulose, such as, for example cellulose acetate, cellulose propionate, cellulose butyrate, and will be described in connection therewith. The organic thermoplastic material may be compounded with plasticizers, fillers, ultra-violet light absorbents, fire-retardants, stabilizers, pigments, nacreous materials, dyes and the like, all in a manner well known in the art. The organic thermoplastic sheeting may be subjected to the polishing operation in the form of sheets or strips, or preferably, in the form of a web of substantial length.

The accompanying drawing shows diagrammatically an apparatus that may be employed for carrying out the process of the present invention.

Referring now to the drawing, the reference numeral 11 designates a supply roll from which is drawn a web 12 of organic thermoplastic sheeting. The web 12 is passed between a pair of positively driven unheated or cooled rolls 13 and 14, which are urged towards each other in any suitable manner, as by springs or screws, and is then wound onto a take-up roll 15.

A drag (not shown) may be placed on the supply roll 11 to impose a sufficient tension on the web 12 to prevent twisting or buckling thereof before it reaches the rolls 13 and 14. In addition, the take-up roll 15 is positively driven to impose a tension on the web 12 after it leaves the rolls 13 and 14, said tension being at least sufficient to prevent twisting and buckling of said web. The tension imposed on the web 12 by the feed roll 15 may, if desired, also supply a portion of the force necessary to move said web between the rolls 13 and 14.

The following examples are given to illustrate this invention further.

Example I

A white gel-containing sheeting having a thickness of 7½ mils and prepared by extrusion from a cellulose acetate composition containing 27.5 parts by weight of diethyl phthalate, 7.5 parts by weight of triphenyl phosphate, and 1½ parts by weight of titanium dioxide for each 100 parts by weight of cellulose acetate is pressed in a single pass between unheated smooth-surfaced rolls to a thickness of 6 mils. The pressed sheeting has a materially improved appearance and a more uniform gage as compared to the original sheeting.

Example II

A brown gel-containing sheeting having a thickness of 11½ mils and prepared by extrusion from a cellulose acetate composition containing 40 parts by weight of acetyl triethyl citrate, 15 parts by weight of mixed ortho and para n-ethyl toluene sulphonamides and 2 parts by weight of cadmium selenide+⅓ part of carbon black for each 100 parts by weight of cellulose acetate is pressed in a single pass between unheated smooth-surfaced rolls to a thickness of 9½ mils. The pressed sheeting has a materially improved appearance and a more uniform gage as compared to the original sheeting.

Example III

A transparent gel-containing sheeting having a thickness of 3½ mils and prepared by extrusion from a cellulose acetate composition containing 27.5 parts by weight of diethyl phthalate and 7.5 parts by weight of triphenyl phosphate for each 100 parts by weight of cellulose acetate is cooled to +10° F., and is pressed in a single pass between unheated smooth-surfaced rolls to a thickness of 2½ mils. The pressed sheeting has a materially improved appearance and a more uniform gage as compared to the original sheeting.

It is to be understood that the foregoing detailed description is given merely by way of illustration and that many variations may be made therein without departing from the spirit of our invention.

Having described our invention, what we desire to secure by Letters Patent is:

1. In a process for the production of organic acid ester of cellulose sheeting, the step which comprises pressing an unheated organic acid ester of cellulose sheeting having surface blemishes between unheated rotatable surfaces at a pressure of at least about 2000 pounds per square inch whereby the appearance and uniformity of gage of said sheeting are improved.

2. In a process for the production of organic acid ester of cellulose sheeting, the step which comprises pressing an unheated organic acid ester of cellulose sheeting having surface blemishes between unheated rotatable surfaces to effect at least about a 10% reduction in thickness of said sheeting whereby the appearance and uniformity of gage of said sheeting are improved.

3. In a process for the production of organic acid ester of cellulose sheeting, the steps which comprise cooling an organic acid ester of cellulose sheeting having surface blemishes to a temperature of less than about 40° F., and pressing said sheeting between unheated rotatable surfaces at a pressure of at least about 2000 pounds per square inch whereby the appearance and uniformity of gage of said sheeting are improved.

4. In a process for the production of organic acid ester of cellulose sheeting, the steps which comprise cooling an organic acid ester of cellulose sheeting having surface blemishes to a temperature of less than about 40° F., and pressing said sheeting between unheated rotatable surfaces to effect at least about a 10% reduction in thickness of said sheeting whereby the appearance and uniformity of gage of said sheeting are improved.

5. In a process for the production of organic acid ester of cellulose sheeting, the step which comprises pressing an unheated organic acid ester of cellulose sheeting having surface blemishes between cooled rotatable surfaces at a pressure of at least about 2000 pounds per square inch whereby the appearance and uniformity of gage of said sheeting are improved.

6. In a process for the production of organic acid ester of cellulose sheeting, the step which comprises pressing between unheated rolls at a temperature below about 100° F. an unheated extruded organic acid ester of cellulose sheeting having surface blemishes to effect at least about a 10% reduction in thickness of said sheeting whereby the appearance and uniformity of gage of said sheeting are improved.

7. In a process for the production of cellulose acetate sheeting, the step which comprises pressing an unheated cellulose acetate sheeting having surface blemishes between unheated rolls at a pressure of at least about 2000 pounds per square inch whereby the appearance and uniformity of gage of said sheeting are improved.

8. In a process for the production of cellulose acetate sheeting, the step which comprises pressing an unheated cellulose acetate sheeting having surface blemishes between unheated rolls to effect at least about a 10% reduction in thickness of said sheeting whereby the appearance and uniformity of gage of said sheeting are improved.

9. In a process for the production of cellulose acetate sheeting, the step which comprises pressing an unheated cellulose acetate sheeting having surface blemishes between rolls at a temperature of below about 100° F. and at a pressure of at least about 2000 pounds per square inch whereby the appearance and uniformity of gage of said sheeting are improved.

10. In a process for the production of cellulose acetate sheeting, the step which comprises pressing an unheated cellulose acetate extruded sheeting having surface blemishes between rolls at a temperature of below about 100° F. and to effect at least about a 10% reduction in thickness of said sheeting whereby the appearance and uniformity of gage of said sheeting are improved.

11. In a process for the production of cellulose acetate sheeting, the step which comprises pressing an unheated cellulose acetate sheeting having surface blemishes between rolls cooled to a temperature of below about 100° F. and at a pressure of at least about 2000 pounds per square inch whereby the appearance and uniformity of gage of said sheeting are improved.

12. In a process for the production of cellulose acetate sheeting, the step which comprises pressing an unheated cellulose acetate sheeting having surface blemishes between rolls cooled to a temperature of below about 100° F. and to effect at least about a 10% reduction in thickness of said sheeting whereby the appearance and uniformity of gage of said sheeting are improved.

References Cited in the file of this patent

UNITED STATES PATENTS

| Number | Name | Date |
|---|---|---|
| 1,315,480 | Dreyfus | Sept. 9, 1919 |
| 2,177,659 | Kimble et al. | Oct. 31, 1939 |
| 2,219,700 | Perrin et al. | Oct. 29, 1940 |
| 2,244,208 | Miles | June 3, 1941 |
| 2,262,989 | Conklin et al. | Nov. 18, 1941 |
| 2,304,886 | Conklin et al. | Dec. 15, 1942 |
| 2,346,210 | Farguhar | Apr. 11, 1944 |